United States Patent [19]

Cornwall

[11] 4,261,598
[45] Apr. 14, 1981

[54] CONCRETE FLOOR EMBEDDED COUPLING FOR PLASTIC PIPE

[76] Inventor: Kenneth R. Cornwall, 30064 Bentley, Livonia, Mich. 48154

[21] Appl. No.: 64,080

[22] Filed: Aug. 6, 1979

[51] Int. Cl.³ .................................................. F16L 55/07
[52] U.S. Cl. .................................... 285/56; 52/221; 52/699; 52/701; 264/31; 264/333; 285/64; 285/3; 285/383; 285/DIG. 2; 285/DIG. 16; 285/423
[58] Field of Search .......... 285/64, DIG. 2, DIG. 16, 285/383, 3, 4, 56–60, 369, 417, 423; 4/252 R; 52/221, 699, 701; 264/31, 35, 261, 333

[56] References Cited

U.S. PATENT DOCUMENTS

| | | | |
|---|---|---|---|
| 842,363 | 1/1907 | Watrous | 285/58 |
| 2,202,147 | 5/1940 | Gerriets | 285/56 |
| 2,270,286 | 1/1942 | Gerriets | 285/56 |
| 2,527,874 | 10/1950 | Bradley | 285/56 |
| 2,596,182 | 5/1952 | Susaya | 285/3 |
| 3,048,911 | 8/1962 | Almon | 52/221 |
| 3,198,553 | 8/1965 | Fladung | 285/56 |
| 3,294,358 | 12/1966 | Hagedorn | 285/64 X |
| 3,540,064 | 11/1970 | Studer | 4/252 R |
| 3,610,288 | 10/1971 | Carr | 285/383 X |
| 3,643,267 | 2/1972 | Winter | 4/252 R |
| 3,674,288 | 7/1972 | Babb | 285/58 |
| 3,800,486 | 4/1974 | Harvey | 285/56 |
| 3,826,521 | 7/1974 | Wilhelmsen | 285/DIG. 16 |
| 4,052,759 | 10/1977 | Hill | 285/56 |
| 4,170,853 | 10/1979 | Kohout | 52/699 |

Primary Examiner—Dave W. Arola
Attorney, Agent, or Firm—Ian C. McLeod

[57] ABSTRACT

A coupling (10) for plastic pipe (100, 101, 102, 103) which is adapted to be embedded in a concrete floor (300) and to form part of a fluid flow path with the pipe (100 to 103) is described. In particular, the coupling (10) includes a tube (11), preferably integrally molded of plastic, with (1) an integral annular rim (17) inside the coupling (10) with parallel shoulders (18 and 19) perpendicular to a longitudinal cylindrical axis (14) of the tube (11) and with an annular face (20) parallel to the axis between the shoulders (18 and 19), (2) an attachment means, preferably an annular flange (21) with tabs (22) for nails (500) or the like, at one end of the tube (11) adapted to be secured to a form such as a wooden form for pouring the concrete floor (300) around the pipe (100 to 103) and coupling (10) and (3) a removable cover (23) at the end of the tube (11) adjacent the attachment means (21) and adapted to prevent poured cement (300) from entering the inside of the tube (11). The coupling (10) is mounted on a form (200) and the concrete (300) flooring is poured around it. The coupling (10) is particularly adapted for supporting a toilet bowl mounting flange (400) in residential and commercial construction and for mounting plastic piping (101 to 103) between multiple levels of concrete floors (300), usually in commercial construction.

11 Claims, 4 Drawing Figures

CONCRETE FLOOR EMBEDDED COUPLING FOR PLASTIC PIPE

DESCRIPTION OF THE INVENTION

1. Field of the Invention

The present invention relates to a plastic coupling for plastic pipe which is adapted to being embedded in a concrete floor, to the method for using the coupling and to the resulting piping system. In particular, the present invention relates to a coupling wherein a portion of the coupling is in the fluid flow path with the piping.

2. Prior Art

The prior art has developed a variety of means for coupling pipe to other pieces of pipe or toilet bowl mounting flanges through flooring. This prior art is described in U.S. Pat. Nos. 842,363; 2,202,147; 2,270,286; 2,527,874; 3,048,911; 3,198,553; 3,540,064; 3,643,267; 3,674,288; 3,800,486 and 4,052,759. Much of this patent art is concerned with providing forms, sometimes called emplacement formers or sleeves, for pouring a concrete floor so as to provide an opening through the floor for the pipe.

In general, the prior art has used forms which define a tubular volume around which the concrete flooring is poured. The forms can be removed or even be left in place and in both instances the result is to allow a pipe to pass through an opening in the concrete floor provided by the form. It has not occurred to the prior art that the form could also be a coupling in a fluid flow path with the piping. Thus the prior art devices are complicated to manufacture and use and expensive. A major problem is that the prior art devices do not anchor the piping system to the concrete floor.

In commercial construction, concrete floors are sleeved to provide openings for soil pipe, water pipe and the like. Present day construction methods provide for openings through the concrete floors and anchoring means for the piping to the concrete floor. Plastic pipe expands and contracts and thus usually it is not used in commercial construction where there are more than two levels with concrete floors. More expensive and much heavier steel, cast iron or copper pipe is used in these applications.

A further problem is that there are spaces between the pipe and the concrete floor which provide a chimney for fire and various means for filling the spaces are provided by the prior art in an attempt to solve this problem.

OBJECTS

It is therefore an object of the present invention to provide an improved plastic pipe coupling which is adapted to be anchored by a concrete floor and wherein a portion of the coupling is in the flow path with the pipe. It is further an object of the present invention to provide a coupling which is adapted for mounting a toilet bowl flange and for mounting and anchoring piping between concrete floors at multiple levels in a building. Further still it is an object of the present invention to provide a coupling which eliminates a space which can act as a fire chimney between the piping and the concrete floor. Finally it is an object of the present invention to provide a coupling which is simple and inexpensive to make as an integral, molded unit from plastic. These and other objects of the present invention will become apparent from the following description and from the drawings.

IN THE DRAWINGS

GENERAL DESCRIPTION

Figure 1:
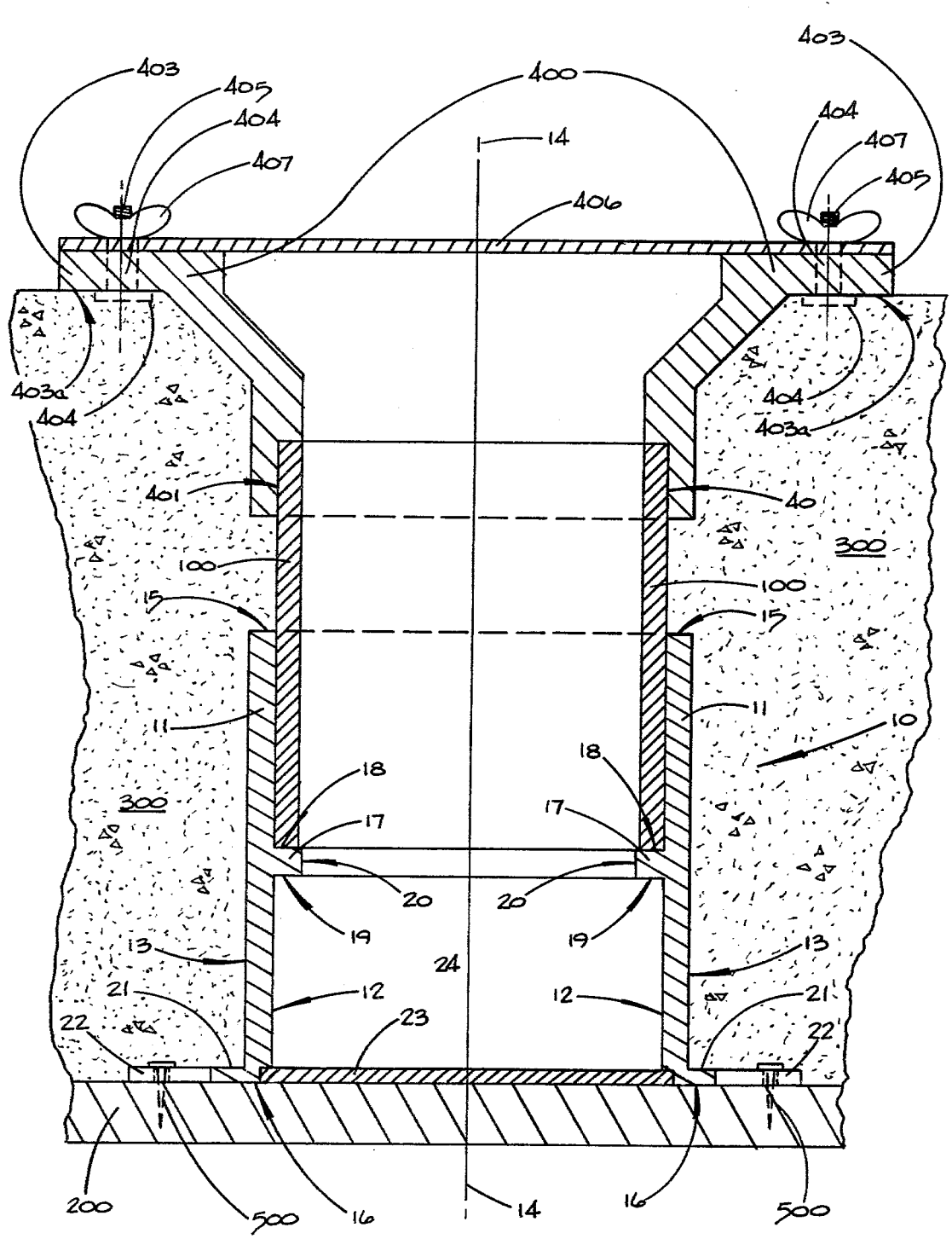
FIG. 1 is a front cross-sectional view of the plastic coupling in a preferred piping system of the present invention particularly illustrating a length of tube and a toilet bowl mounting flange attached to the coupling and a removeable form supporting a concrete floor in which the coupling, length of pipe and a portion of the flange are embedded.
Figure 2:
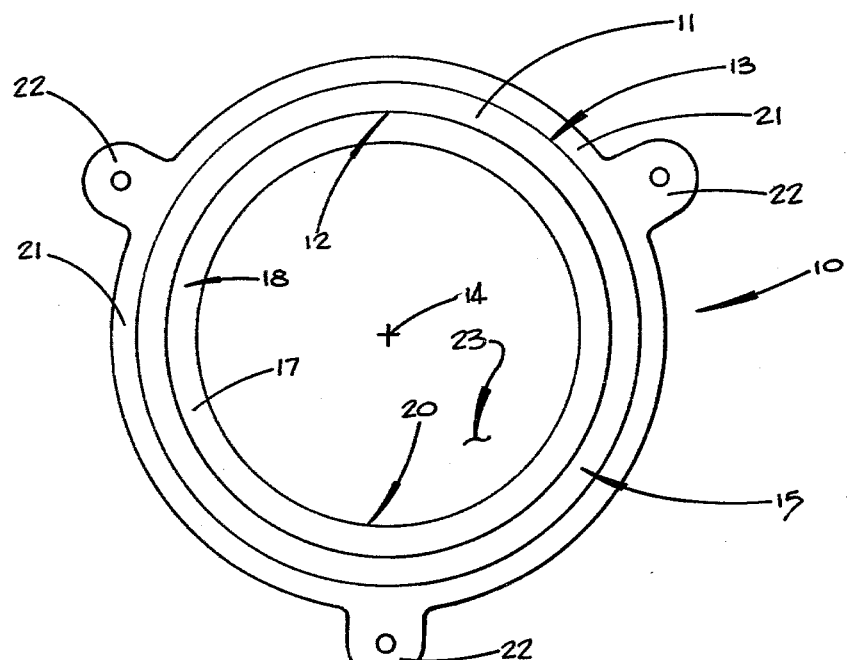
FIG. 2 is a plan view of the coupling shown in FIG. 1 without the associated components of the system of FIG. 1.
Figure 3:
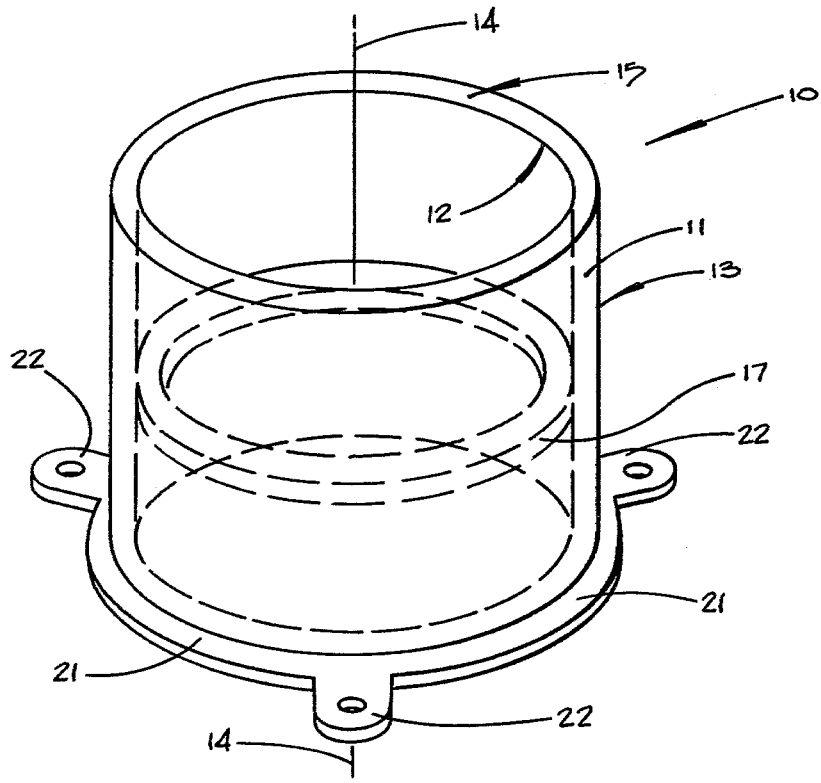
FIG. 3 is a perspective view of the coupling shown in FIGS. 1 and 2.

The present invention relates to a coupling for plastic pipe having spaced apart parallel cylindrical inside and outside walls which coupling is adapted to be embedded in a concrete floor and to be at least temporarily supported by a form for pouring the concrete floor which comprises: a tube having an inside cylindrical wall defining a cylindrical longitudinal axis, an outside wall and opposing ends between the walls, wherein the inside wall of the tube mates with the outside wall of the pipe; an integral annular rim between the ends and around the inside wall of the tube with two spaced apart parallel shoulders which are perpendicular to the axis of the tube and with an annular face between the shoulders which is parallel to the axis of the tube, wherein the shoulders of the annular rim have a height which is approximately the same as the spaced apart walls of the pipe with which the coupling is to be used such that the annular face is in a fluid flow path through the pipe; attachment means at one end of the tube adapted for securing the coupling to the form using connection means; and a cover removeably attached to the inside wall of the tube at the end adjacent to the attachment means.

The present invention also relates to the method of joining plastic pipe having spaced apart cylindrical inside and outside walls with a concrete slab which comprises: providing a form adapted for pouring of concrete slab, placing a coupling for plastic pipe on the form which coupling includes a tube having an inside cylindrical wall defining a cylindrical longitudinal axis, an outside wall and opposing ends between the walls, wherein the inside wall of the tube mates with the outside wall of the pipe, an integral annular rim between the ends and around the inside wall of the tube with two spaced apart parallel shoulders which are perpendicular to the axis of the tube and with an annular face between the shoulders which is parallel to the axis of the tube, wherein the shoulders of the annular rim have a height which is approximately the same as the spaced apart walls of the pipe with which the coupling is to be used such that the annular face is in a fluid flow path with the pipe, attachment means at one end of the tube adapted for securing the coupling to the form using connection means; bonding the outside wall of a length of plastic pipe to the inside wall of the coupling at one end of the tube such that an end of the length of pipe abuts against one shoulder of the annular rim; and pouring the concrete floor over the form and around the coupling and allowing the concrete to set.

The present invention further relates to a plastic piping system which comprises: a coupling for plastic pipe having spaced apart cylindrical inside and outside walls which is adapted to be embedded in a concrete slab and which is at least temporarily supported by a form for pouring the concrete floor including a tube having an inside cylindrical wall defining a cylindrical longitudinal axis and an outside wall and ends between the walls; an annular rim between the ends and around the inside wall of the tube with two spaced apart parallel shoulders which are perpendicular to the axis of the tube and with an annular face between the shoulders which is parallel to the axis of the tube, wherein the shoulders of the annular rim have a height which is approximately the same as the spaced apart walls of the pipe with which the coupling is to be used such that the annular face is in a fluid flow path with the pipe; attachment means at one end of the tube adapted for securing the coupling to the form using connector means; two lengths of the plastic pipe with the outside wall of the pipe bonded to the inside wall of the tube and abutted against both shoulders of the rim; and a cement slab around the outside wall of the coupling.

Plastic piping is well known to those in the construction trade and is generally made out of a polyvinyl chloride polymer (PVC) or acrylonitrile-butadiene-styrene polymers (ABS). The plastic coupling of the present invention is preferably made out of one or the other polymer as a unit by injection molding.

SPECIFIC DESCRIPTION

Referring to FIGS. 1 to 4 the preferred integrally molded plastic coupling 10 is shown in various settings. The coupling 10 includes a tube 11 with parallel inside and outside walls 12 and 13, respectively, which define a longitudinal axis 14 of the tube 11. The opposing ends 15 and 16 are provided between the sides 12 and 13. An integral annular rim 17 is provided as part of the inside wall of 12 of the tube 11. The rim 17 includes parallel shoulders 18 and 19 perpendicular to the axis 14 and an annular face 20 parallel to the axis 14. The shoulders 18 and 19 have a height which is about equal to the thickness or spacing of the walls of the pipe 100 and the face 20 is in the fluid flow path of the pipe 100. Preferably the rim 17 is about midway between the ends of the tube 11. The short length of pipe 100 abuts against the shoulder 18 as shown in FIG. 1 and in FIG. 4 the long lengths of pipes 101, 102 and 103, abut against shoulders 18 and 19 of couplings 10. The outside walls of pipes 100, 101, 102, and 103 are bonded with an adhesive or bonding agent to the inside walls 12 of the tubes 11. At one end of the tube 12 an annular flange 21 with tabs 22 is provided as an extension of the outside wall 13 of the tube 11 at end 16 and is perpendicular to the axis 14. The flange 21 is adapted to be secured to a form 200 (FIGS. 1 and 4) which is usually made of wood and which can be temporary or permanent, for pouring the concrete floor 300. The annular flange 21 is secured to the form 200 by means of nails 500 or by other, preferably removeable, attachment means through tabs 22. A frangible or removeable cover 23 is preferably provided to close the opening 24 in the tube 11 at end 16 in recess 16a. The outside wall 13 of the tube 11 can include multiple projections or lugs (not shown) which aid in locking the coupling 10 in the concrete 300. The coupling 10 is constructed in a manner so as to be injection moldable in a double cavity mold cavity (not shown).

Figure 4:
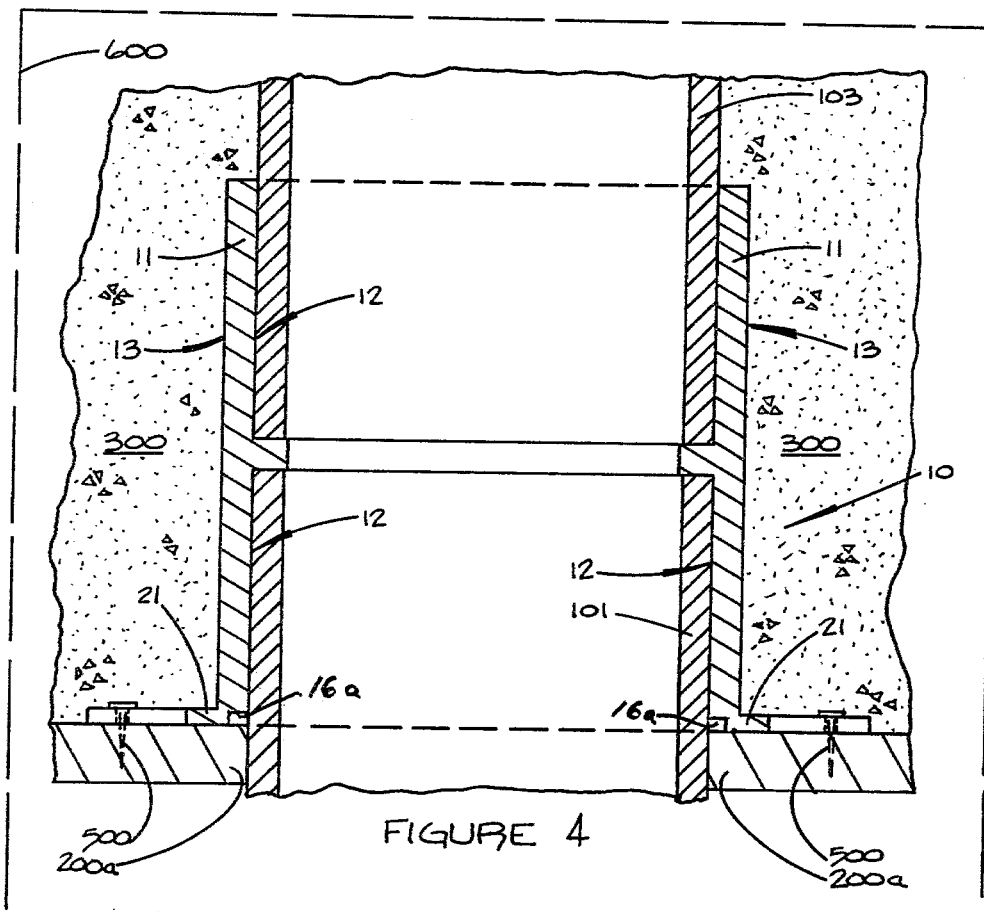
FIG. 4 is a front cross-sectional view of two plastic couplings joined to lengths of pipe in the preferred piping system of the present invention, particularly illustrating a length of plastic pipe locked in position between two concrete floors, so as to thereby restrict the effect of the expansion and contraction of the length of pipe.
Figure 4:
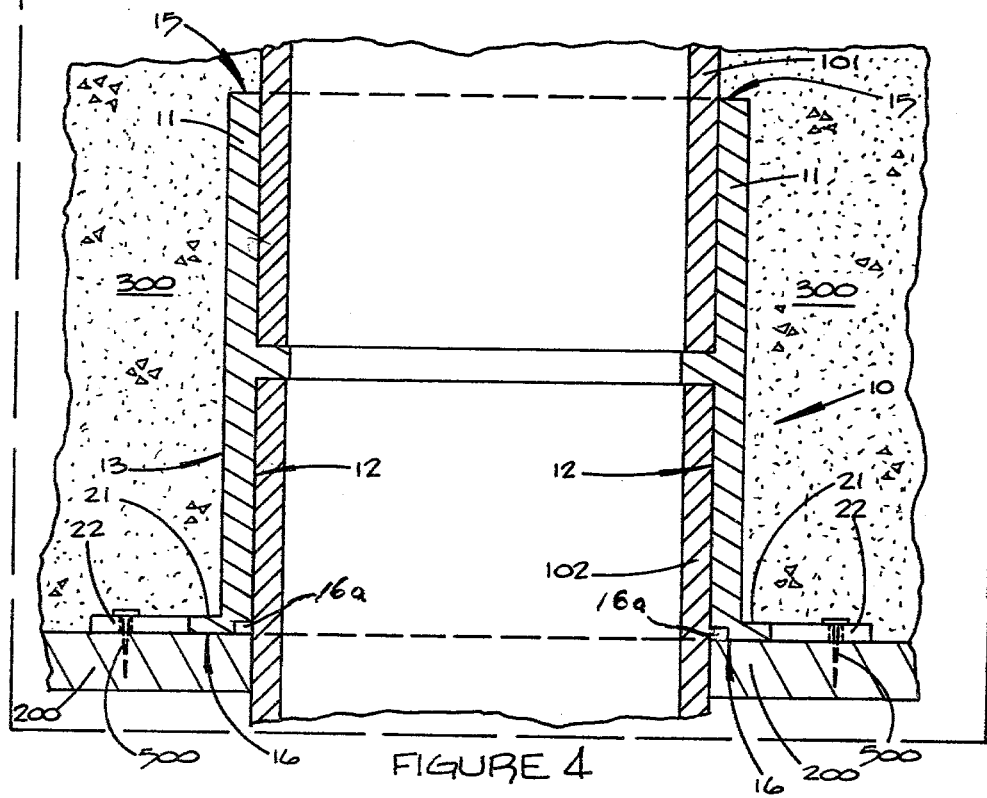

The method of using the coupling 10 is shown in FIGS. 1 and 4. In FIG. 1, a toilet bowl mounting flange 400 is mounted on tube 100. A portion of the outside of flange 400 and the outside of the tube 100 are embedded in the concrete. The coupling 10 is secured to the form 200 by means of nails 500. The pipe 100 is bonded to the inside wall of the coupling 10 and abutted to the shoulder 18 of the rim 17. The flange 400 has a recess 401 into which the outside wall of the opposite end of the length of pipe 100 fits and is bonded. Mounting bolts 404 are provided in slots (not shown) in the mounting ring 403 of the flange 400 with the heads 404a towards the coupling 10 and the stems 405 perpendicular to the axis 14 of the tube 11. A cover 406 is provided over the mounting ring 403 and secured in place by stems 405 and nuts 407. The concrete floor 300 is poured on the sheet form 200 to a level which embeds the heads 404 of the bolts at the underside 403a of the ring 403 and is allowed to set. The wooden form or deck 200 is usually removed if desired. The cover 23 is then knocked out or removed and a second length of pipe (not shown) is fitted into the opening 24 against the shoulder 19 in the manner shown in FIG. 4.

FIG. 4 shows two wooden forms 200 and 200a with two couplings 10 in place in a building 600 shown in general in broken lines with piping 101, 102 and 103 extending from the coupling 10. The piping 101 and 103 is in position when the concrete floor 300 is poured and portions of the pipes 101 and 103 are also embedded in the concrete floor 300. In this construction, the forms 200 and 200a are generally removed before positioning the pipe 101 or 102 in contrast to what is shown in FIG. 4.

As can be seen from the foregoing description the coupling 10 essentially "locks" the piping in position. The cover 23 is easily removed from the underside of the concrete floor 300 when the form 200 is removed and prevents the uncured concrete from flowing inside the coupling 10. This construction is preferred.

I claim:

1. A coupling for plastic pipe having spaced apart parallel cylindrical inside and outside walls which coupling is adapted to be embedded in a concrete floor and to be at least temporarily supported by a form for pouring the concrete floor which comprises:
   (a) a tube having an inside cylindrical wall defining a cylindrical longitudinal axis, an outside wall and opposing ends between the walls, wherein the inside wall of the tube mates with the outside wall of the pipe;
   (b) an integral annular rim between the ends and around the inside wall of the tube with two spaced apart parallel shoulders which are perpendicular to the axis of the tube and with an annular face between the shoulders which is parallel to the axis of the tube wherein the shoulders of the annular rim have a height which is approximately the same as the spaced apart walls of the pipe with which the coupling is to be used such that the annular face is in a fluid flow path through the pipe;
   (c) attaching means at one end of the tube adapted for securing the coupling to the form using connection means; and (d) a cover removeably attached to the inside wall of the tube at the end adjacent to the attachment means.

2. The coupling of claim 1 wherein the attachment means is an annular flange with tabs having openings adapted to receive nails.

3. The coupling of claim 1 wherein the annular rim is about midway between the ends of the tube.

4. The method of joining plastic pipe having spaced apart cylindrical inside and outside walls with a concrete floor which comprises:
 (a) providing a form adapted for pouring of concrete slab;
 (b) placing a coupling for plastic pipe on the form which coupling includes a tube having an inside cylindrical wall defining a cylindrical longitudinal axis an outside wall and opposing ends between the walls wherein the inside wall of the tube mates with the outside wall of the pipe, an integral annular rim between the ends and around the inside wall of the tube with two spaced apart parallel shoulders which are perpendicular to the axis of the tube and with an annular face between the shoulders and which is parallel to the axis of the tube, wherein the shoulders of the annular rim have a height which is approximately the same as the spaced apart walls of the pipe with which the coupling is to be used such that the annular face is in a fluid flow path with the pipe, attachment means at one end of the tube adapted for securing the coupling to the form using connector means;
 (c) bonding the outside wall of a length of plastic pipe to the inside wall of the coupling at one end of the tube such that an end of the length of pipe abuts against one shoulder of the annular rim; and
 (d) pouring the concrete floor over the form and around the coupling and allowing the concrete to set.

5. The method of claim 4 wherein the length of pipe is short and bonded to a toilet bowl flange having an annular mounting ring with slots holding spaced apart bolt heads such that threaded stems attached to the bolt heads project above the ring and away from the coupling and wherein the length of pipe and a portion of the flange below the annular mounting ring are embedded in the concrete floor.

6. The method of claim 5 wherein a removeable cover is provided over the annular mounting ring and is held in place by nuts on the threaded stems of the bolts.

7. The method of claim 5 wherein the length of pipe extends between two forms adapted for pouring a concrete floor and wherein in addition a second coupling is attached on an end of the length of pipe opposite the end where the first coupling is attached for pouring a second concrete floor.

8. The method of claim 5 wherein the tube includes a removeable cover at the end adjacent the attachment means.

9. A plastic piping system which comprises:
 (a) a coupling for plastic pipe having spaced apart cylindrical inside and outside walls which is adapted to be embedded in a concrete slab and which is at least temporarily supported by a form for pouring the concrete floor including a tube having an inside cylindrical wall defining a cylindrical longitudinal axis, an outside wall and opposing ends between the walls; an annular rim between the ends and around the inside wall of the tube with two spaced apart parallel shoulders which are perpendicular to the axis of the tube and with an annular face between the shoulders which is parallel to the axis of the tube, wherein the shoulders of the annular rim have a height which is approximately the same as the spaced apart walls of the pipe with which the coupling is to be used such that the annular face is in a fluid flow path with the pipe; attachment means at one end of the tube adapted for securing the coupling to the form using connector means;
 (b) two lengths of the plastic pipe with the outside wall of the pipe bonded to the inside wall of the tube and abutted against both shoulders of the rim; and
 (c) a cement slab around the outside wall of the coupling.

10. The piping system of claim 9 wherein a toilet bowl mounting flange with an annular mounting ring and with slots mounting spaced apart bolt heads such that threaded stems attached to the bolt heads project above the ring away from the coupling, wherein the flange is mounted on a short length of the pipe at an end opposite the coupling attachment end of the pipe and wherein the coupling and the length of pipe are embedded in the slab.

11. The piping system of claim 9 wherein at least two couplings are at opposite ends of lengths of pipe extending between multiple concrete floors in a building.

* * * * *

REEXAMINATION CERTIFICATE (391st)
United States Patent [19]
Cornwall

[11] B1 4,261,598
[45] Certificate Issued  Sep. 24, 1985

[54] CONCRETE FLOOR EMBEDDED COUPLING FOR PLASTIC PIPE

[76] Inventor: Kenneth R. Cornwall, 30064 Bentley, Livonia, Mich. 48154

Reexamination Request:
No. 90/000,565, May 30, 1984

Reexamination Certificate for:
Patent No.: 4,261,598
Issued: Apr. 14, 1981
Appl. No.: 64,080
Filed: Aug. 6, 1979

[51] Int. Cl.$^4$ .............................................. F16L 55/07
[52] U.S. Cl. ........................................ 285/56; 52/699; 52/701; 52/221; 264/31; 264/333; 285/64; 285/3; 285/383; 285/423; 285/DIG. 2; 285/DIG. 16
[58] Field of Search .................... 49/177; 52/302, 220; 285/192, 158, DIG. 16, 423, 56, 64, 3, 383

[56] References Cited

U.S. PATENT DOCUMENTS

| | | | |
|---|---|---|---|
| 842,363 | 1/1907 | Watrous | 285/58 |
| 2,202,147 | 5/1940 | Gerriets | 285/56 |
| 2,249,824 | 7/1941 | Hall . | |
| 2,270,286 | 1/1942 | Gerriets | 285/56 |
| 2,498,831 | 2/1950 | Veitch . | |
| 2,527,874 | 10/1950 | Bradley | 25/118 |
| 2,596,182 | 5/1952 | Susaya | 285/30 |
| 2,684,518 | 7/1954 | Whitlock | 25/128 |
| 2,694,847 | 11/1954 | Christiansen . | |
| 2,728,126 | 12/1955 | Whitlock | 25/128 |
| 2,823,049 | 2/1958 | Hombach . | |
| 3,048,911 | 8/1962 | Almon | 52/221 |
| 3,198,553 | 8/1965 | Fladung | 285/56 |
| 3,265,349 | 8/1966 | Hamrick | 249/177 |
| 3,276,929 | 10/1966 | Ferch . | |
| 3,294,358 | 12/1966 | Hagedorn | 285/64 X |
| 3,463,691 | 8/1969 | Martin | 285/423 X |
| 3,540,064 | 11/1970 | Studer | 4/252 R |
| 3,542,402 | 11/1970 | Caples | 285/423 X |
| 3,610,288 | 10/1971 | Carr | 285/383 X |
| 3,643,267 | 2/1972 | Winter | 4/252 R |
| 3,674,288 | 7/1972 | Babb | 285/58 |
| 3,800,486 | 4/1974 | Harvey | 285/56 |
| 3,826,521 | 7/1974 | Wilhelmsen | 285/DIG. 16 |
| 4,019,760 | 4/1977 | Streit | 285/158 X |
| 4,052,759 | 10/1977 | Hill | 285/56 |
| 4,078,834 | 3/1978 | Hauff | 285/158 X |
| 4,170,853 | 10/1977 | Kohant | 52/99 |
| 4,174,126 | 11/1979 | Hauff | 285/158 |
| 4,235,259 | 11/1980 | Hudock | 285/56 |

FOREIGN PATENT DOCUMENTS

| | | | |
|---|---|---|---|
| 579721 | 7/1959 | Canada . | |
| 1014803 | 8/1957 | Fed. Rep. of Germany | 285/DIG. 16 |
| 2615428 | 10/1977 | Fed. Rep. of Germany . | |

Primary Examiner—T. F. Callaghan

[57] ABSTRACT

A coupling (10) for plastic pipe (100, 101, 102, 103) which is adapted to be embedded in a concrete floor (300) and to form part of a fluid flow path with the pipe (100 to 103) is described. In particular, the coupling (10) includes a tube (11), preferably integrally molded of plastic, with (1) an integral annular rim (17) inside the coupling (10) with parallel shoulders (18 and 19) perpendicular to a longitudinal cylindrical axis (14) of the tube (11) and with an annular face (20) parallel to the axis between the shoulders (18 and 19), (2) an attachment means, preferably an annular flange (21) with tabs (22) for nails (500) or the like, at one end of the tube (11) adapted to be secured to a form such as a wooden form for pouring the concrete floor (300) around the pipe (100 to 103) and coupling (10) and (3) a removable cover.(23) at the end of the tube (11) adjacent the attachment means (21) and adapted to prevent poured cement (300) from entering the inside of the tube (11). The coupling (10) is mounted on a form (200) and the concrete (300) flooring is poured around it. The coupling (10) is particularly adapted for supporting a toilet bowl mounting flange (400) in residential and commercial construction and for mounting plastic piping (101 to 103) between multiple levels of concrete floors (300), usually in commercial construction.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4-11 is confirmed.

Claims 1-3 are cancelled.

* * * * *